UNITED STATES PATENT OFFICE.

JAMES T. FRETWELL, OF ATLANTA, GEORGIA.

ROOFING COMPOUND.

SPECIFICATION forming part of Letters Patent No. 297,374, dated April 22, 1884.

Application filed November 13, 1883. (No specimens.)

*To all whom it may concern:*

Be it known that I, J. T. FRETWELL, of Atlanta, in the county of Fulton and State of Georgia, have invented certain new and useful Improvements in Roofing Compounds; and I do hereby declare that the following is a full, clear, and exact description thereof.

The object I have in view is to produce a plastic roofing compound which, when applied, will soon solidify and become, so to speak, one homogeneous sheet of insoluble and fire-proof material, capable of resisting, in a great measure, the disintegrating effects of atmospheric changes.

To these ends my invention consists in the combination of such ingredients as will be hereinafter set forth.

In order that others may enjoy the benefits of my invention, I will now proceed to describe it.

I first take, say, one barrel of Roman cement, and thoroughly mix it with two-thirds of a barrel of sand. I then add about one hundred pounds of white lead and five pounds of litharge, and moisten the whole with a sufficient quantity of linseed-oil to make a mortar of such consistency that it may be spread evenly over a roof, which of course is properly boarded for this purpose. In a short time the compound will dry and become both a fire and water proof coating over the roof.

I am well aware that some of the ingredients composing my compound have been used for a similar purpose; but I am not aware that all of the ingredients herein named have been combined in a single compound and mixed in about the proportions specified.

What I claim as new, and desire to secure by Letters Patent, is—

A roofing compound composed of Roman cement, sand, white lead, litharge, and linseed-oil, all mixed together in about the proportions and in the manner specified.

In testimony that I claim the foregoing as my own I affix my signature in presence of two witnesses.

J. T. FRETWELL.

Witnesses:
R. A. ✕ SHEPHERD,
    his mark.
H. P. BROWN.